United States Patent
Sakaguchi et al.

(10) Patent No.: US 10,975,227 B2
(45) Date of Patent: Apr. 13, 2021

(54) CURING ACCELERATOR AND RADICAL POLYMERIZABLE RESIN COMPOSITION

(71) Applicant: SHOW A DENKO K.K., Tokyo (JP)

(72) Inventors: Yoichiro Sakaguchi, Kumagaya (JP); Takuya Minami, Chiba (JP); Yoshishige Okuno, Kawasaki (JP); Atsushi Umino, Fukaya (JP); Yoshitaka Ishibashi, Kawasaki (JP)

(73) Assignee: SHOWA DENKO K.K., Tokyo (JP)

( * ) Notice: Subject to any disclaimer, the term of this patent is extended or adjusted under 35 U.S.C. 154(b) by 82 days.

(21) Appl. No.: 16/341,151

(22) PCT Filed: Sep. 4, 2017

(86) PCT No.: PCT/JP2017/031802
§ 371 (c)(1),
(2) Date: Apr. 11, 2019

(87) PCT Pub. No.: WO2018/079078
PCT Pub. Date: May 3, 2018

(65) Prior Publication Data
US 2020/0181365 A1  Jun. 11, 2020

(30) Foreign Application Priority Data

Oct. 26, 2016  (JP) .................. 2016-209812

(51) Int. Cl.
*C08F 20/00*  (2006.01)
*C08K 5/548*  (2006.01)

(52) U.S. Cl.
CPC .............. *C08K 5/548* (2013.01); *C08F 20/00* (2013.01)

(58) Field of Classification Search
CPC ............................... C08K 5/548; C08F 20/00
See application file for complete search history.

(56) References Cited

U.S. PATENT DOCUMENTS

| | | | |
|---|---|---|---|
| 4,382,132 A | 5/1983 | Kelley et al. | |
| 4,507,432 A | 3/1985 | Banno et al. | |
| 5,310,826 A * | 5/1994 | Giovando | C08F 299/04 252/182.17 |
| 2014/0371398 A1 * | 12/2014 | Hashimoto | C08F 290/04 525/245 |

FOREIGN PATENT DOCUMENTS

| | | |
|---|---|---|
| CN | 103555062 A | 2/2014 |
| JP | 57-200409 A | 12/1982 |
| JP | 59-081322 A | 5/1984 |
| JP | 6-199952 A | 7/1994 |
| JP | 2002-145915 A | 5/2002 |
| JP | 2002-155111 A | 5/2002 |
| JP | 2013-189540 A | 9/2013 |
| JP | 2013-227426 A | 11/2013 |
| JP | 2015-151468 A | 8/2015 |
| JP | 5809346 B2 | 11/2015 |
| WO | 2013/084753 A1 | 6/2013 |
| WO | 2016/076209 A1 | 5/2016 |
| WO | 2016/171151 A1 | 10/2016 |

OTHER PUBLICATIONS

Machine translation of JP2013189540 (Year: 2013).*
The Extended European Search Report dated May 7, 2020, issued by the European Patent Office in application No. 17863642.9.
Shigeki Matsunaga, "The Relationship of Electron State and Curing Performance of Cobalt-amine Complex Dryer", DIC Technical Review No. 5, Jun. 1999, pp. 51-56.
International Search Report for PCT/JP2017/031802 dated Oct. 10, 2017 [PCT/ISA/210].
Communication dated Aug. 31, 2020, issued by the State Intellectual Property Office of the P.R.C. in application No. 201780061530.9.

* cited by examiner

*Primary Examiner* — Wenwen Cai
(74) *Attorney, Agent, or Firm* — Sughrue Mion, PLLC

(57) ABSTRACT

A curing accelerator can exhibit good curing acceleration performance and is excellent in storage stability, while maintaining sufficient pot life in a curing reaction of radical-polymerizable resins, and a radical-polymerizable resin composition uses the curing accelerator. The curing accelerator for radical-polymerizable resins includes a metal-containing compound (A), a thiol compound (B) and an aprotic solvent (C) having a dielectric constant of 10 or less, wherein the metal-containing compound (A) is one or more compounds selected from a metal soap (A1) and a β-diketone skeleton-having metal complex (A2), the thiol compound (B) is one or more compounds selected from a mono-functional primary thiol compound (B1), a secondary thiol compound (B2) and a tertiary thiol compound (B3), and the content of the aprotic solvent (C) is 10 to 1,000 parts by mass relative to 100 parts by mass of the total of the metal-containing compound (A) and the thiol compound (B).

6 Claims, No Drawings

CURING ACCELERATOR AND RADICAL POLYMERIZABLE RESIN COMPOSITION

CROSS REFERENCE TO RELATED APPLICATIONS

This application is a National Stage of International Application No. PCT/JP2017/031802 filed Sep. 4, 2017, claiming priority based on Japanese Patent Application No. 2016-209812 filed Oct. 26, 2016.

TECHNICAL FIELD

The present invention relates to a curing accelerator favorably applicable to a radical-polymerizable resin, and to a radical-polymerizable resin composition using the curing accelerator.

BACKGROUND ART

A radical-polymerizable resin composition has many uses for mold fabrication, adhesives, primers, coating materials, as well as for inorganic structure repairing materials for section repairing, crack injection or water sealing, and further for fiber-reinforced composite materials.

For curing a radical-polymerizable resin, in general, a redox-type polymerization initiator such as an organic peroxide is used as the polymerization initiator, and in addition, from the viewpoint of shortening the time for curing the resin composition, a curing accelerator is added thereto.

As a curing accelerator, for example, PTL 1 describes a blend of a cobalt soap and an amine compound.

PTL 1 also describes a method for preparing an accelerator solution suitable for redox curing that uses a peroxide, which comprises adding a transition metal salt or complex to a liquid blend comprising a hydroxy-functional solvent and a nitrogen-containing base with an alkali or alkaline earth metal compound dissolving therein.

On the other hand, it is also known that, when an amine compound or a sulfur compound is used as a curing accelerator in a two-component curable resin composition using a (meth)acrylic group-having compound, the pot life of the composition is short and the composition is difficult to control and, in addition, the physical properties of the cured product thereof worsen (see PTL 2).

Against this, PTL 2 describes an attempt to add a copper compound and/or a vanadium compound, a thiol compound and saccharin for satisfying both prolongation of pot life and maintenance of physical properties of cured products.

In addition, PTL 3 proposes one that comprises a fatty acid iron salt, an iron complex and a salen compound as a curing accelerator for an oxidation polymerization-type unsaturated resin not using a cobalt metal soap that has a risk of a negative influence on human bodies.

CITATION LIST

Patent Literature

PTL 1: JP 5809346 B2
PTL 2: WO2013/084753 A1
PTL 3: JP 2015-151468 A

Non-Patent Literature

NPL 1: Shigeki Matsunaga, "DIC Technical Review No. 5", edited by DIC Corporation, June 1999, pp. 51-56

SUMMARY OF INVENTION

Technical Problem

As described above, it is empirically known that a combination of a specific metal compound and a compound having a specific ligand is effective as a curing accelerator.

However, it could not be said that the conventional curing accelerators described as above would have not only good curing acceleration performance for radical-polymerizable resins but also sufficient performance in point of storage stability and pot life.

The present invention has been made in consideration of such current conditions, and its object is to provide a curing accelerator for radical-polymerizable resins, which maintains a sufficient pot life in curing reaction of radical-polymerizable resins, which can exhibit a good curing acceleration performance and which is excellent in storage stability, and to provide a radical-polymerizable resin composition using the curing accelerator.

Solution to Problem

The present invention is based on a finding that a composition comprising a combination of a predetermined metal-containing compound, a thiol compound and a solvent can function as a curing accelerator excellent in storage stability and also in curing acceleration performance in curing reaction of a radical-polymerizable resin.

Specifically, the present invention provides the following [1] to [7].

[1] A curing accelerator for radical-polymerizable resins, comprising a metal-containing compound (A), a thiol compound (B) and an aprotic solvent (C), wherein the metal-containing compound (A) is one or more compounds selected from the group consisting of a metal soap (A1) and a β-diketone skeleton-having metal complex (A2), the thiol compound (B) is one or more compounds selected from the group consisting of a mono-functional primary thiol compound (B1), a secondary thiol compound (B2) and a tertiary thiol compound (B3), and the content of the aprotic solvent (C) is from 10 to 1,000 parts by mass relative to 100 parts by mass of the total of the metal-containing compound (A) and the thiol compound (B).

[2] The curing accelerator according to the above [1], wherein the thiol compound (B) has an ester structure represented by the following general formula (Q-1):

$$*-OOC-(CH_2)_a-\underset{R^2}{\overset{R^1}{\underset{|}{\overset{|}{C}}}}-SH \quad (Q-1)$$

wherein $R^1$ and $R^2$ each independently represent a hydrogen atom, an alkyl group having 1 to 10 carbon atoms, or an aromatic group having 6 to 18 carbon atoms; * bonds to an organic group; and $a$ represents an integer of 0 to 2.

[3] The curing accelerator according to the above [2], wherein the thiol compound (B) is one or more selected from the group consisting of a secondary thiol compound (B2)

and a tertiary thiol compound (B3), and is an ester compound of a mercapto group-containing carboxylic acid represented by the following general formula (S) and a polyhydric alcohol:

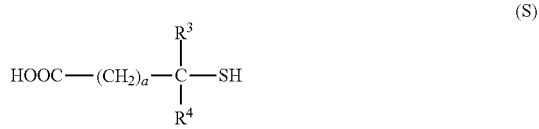

(S)

wherein $R^3$ represents a hydrogen atom, an alkyl group having 1 to 10 carbon atoms, or an aromatic group having 6 to 18 carbon atoms; $R^4$ represents an alkyl group having 1 to 10 carbon atoms, or an aromatic group having 6 to 18 carbon atoms; and a represents an integer of 0 to 2.
[4] The curing accelerator according to any one of the above [1] to [3], wherein the aprotic solvent (C) is one or more compounds selected from the group consisting of an aliphatic hydrocarbon, an aromatic hydrocarbon, an ether, a ketone, an ester and a chain carbonate.
[5] The curing accelerator according to any one of the above [1] to [4], wherein the content of the thiol compound (B) is from 0.01 to 15 mol relative to 1 mol of the metal component of the metal-containing compound (A).
[6] A radical-polymerizable resin composition comprising the curing accelerator of any one of the above [1] to [5], and a radical-polymerizable compound (D).
[7] The radical-polymerizable resin composition according to the above [6], further comprising a radical polymerization initiator (E).

Advantageous Effects of Invention

The curing accelerator of the present invention maintains a sufficient pot life in curing reaction of radical-polymerizable resins, exhibits a good curing acceleration performance and is excellent in storage stability.
Accordingly, using the curing accelerator of the present invention, the processability of a radical-polymerizable resin composition can be improved to give a cured product thereof.
In addition, the radical-polymerizable resin composition of the present invention comprises the curing accelerator and can more rapidly give a cured product of the resin composition.

DESCRIPTION OF EMBODIMENTS

The curing accelerator of the present invention, and the radical-polymerizable resin composition using the curing accelerator are described in detail hereinunder.
[Curing Accelerator]
The curing accelerator of the present invention is a curing accelerator for radical-polymerizable resins, and comprises a metal-containing compound (A), a thiol compound (B) and an aprotic solvent (C) having a dielectric constant of 10 or less. The metal-containing compound (A) is one or more compounds selected from the group consisting of a metal soap (A1) and a β-diketone skeleton-having metal complex (A2). The thiol compound (B) is one or more compounds selected from the group consisting of a mono-functional primary thiol compound (B1), a secondary thiol compound (B2) and a tertiary thiol compound (B3). The content of the aprotic solvent (C) is 10 to 1,000 parts by mass relative to 100 parts by mass of the total of the metal-containing compound (A) and the thiol compound (B).
The curing accelerator can exhibit a good curing acceleration performance in curing reaction of a radical-polymerizable resin, and is excellent in the balance between the storage stability and the pot life thereof.
The curing accelerator may comprise a surfactant, water, a reducing agent, a plasticizer, a polymerization inhibitor, a filler, a pigment and the like, in addition to the metal-containing compound (A), the thiol compound (B) and the aprotic solvent (C), depending on the kind and the use of the radical-polymerizable resin to be added thereto. However, from the viewpoint of exhibiting a sufficient curing acceleration performance, preferably, the total content of the metal-containing compound (A), the thiol compound (B) and the aprotic solvent (C) in the curing accelerator is 50 to 100% by mass, more preferably 70 to 100% by mass, even more preferably 90 to 100% by mass.
(Metal-Containing Compound (A))
The metal-containing compound (A) for use in the curing accelerator of the present invention is a compound selected from the group consisting of a metal soap (A1) and a β-diketone skeleton-having metal complex (A2). One alone of these may be used, or two or more kinds thereof may be used in combination.
The content of the metal-containing compound (A) in the curing accelerator is, from the viewpoint of reaction control or storage stability (metal component aggregation) and the cost (scarcity) of the metal compound, preferably 0.1 to 50% by mass, more preferably 1 to 40% by mass.
<Metal Soap (A1)>
The metal soap (A1) is a metal salt of a long-chain fatty acid or any other organic acid. In general, metal soap does not comprise a sodium salt and a potassium salt, but in the present invention, the metal soap may be these metal salts.
The long-chain fatty acid may be either a saturated fatty acid or an unsaturated fatty acid. The carbon number thereof is not specifically limited, but is, from the viewpoint of solubility of the metal soap (A1) in the aprotic solvent (C), preferably 6 to 30, more preferably 6 to 20, even more preferably 6 to 16. Examples of the long-chain fatty acid include a chain or cyclic saturated fatty acid such as heptanoic acid, octanoic acid such as caprylic acid and 2-ethylhexanoic acid, nonanoic acid, decanoic acid, neodecanoic acid, undecanoic acid, dodecanoic acid, tetradecanoic acid, hexadecanoic acid, octadecanoic acid, eicocanoic acid, docosanoic acid, tetracosanoic acid, hexacosanoic acid, octacosanoic acid, triacontanoic acid, and naphthenic acid; and an unsaturated fatty acid such as oleic acid, linoleic acid, and linolenic acid. In addition, examples of the long-chain fatty acid include other natural substances-derived rosin acids, linseed oil extracted fatty acids, soybean oil extracted fatty acids, and tall oil extracted fatty acids. Among these, octanoic acid and naphthenic acid are preferred, and 2-ethylhexanoic acid and naphthenic acid are more preferred.
Examples of the other organic acids include weak acids having a carboxy group, a hydroxy group, an enol group or the like, and are preferably those soluble in organic solvents.
Examples of the weak acid having a carboxy group include carboxylic acids such as formic acid, acetic acid, and oxalic acid; a hydroxy acid such as citric acid, gallic acid, sugar acid, 12-hydroxystearic acid, hydroxycinnamic acid, and folic acid; an amino acid such as alanine and arginine; and an aromatic acid such as benzoic acid and phthalic acid.
Examples of the compound having a hydroxy group or an enol group include ascorbic acid, α-acid, imide acid, erythorbic acid, croconic acid, kojic acid, squaric acid, sulfinic acid, teichoic acid, dehydroacetic acid, delta acid, uric acid, hydroxamic acid, humic acid, fulvic acid, and phosphonic acid.

As the metal element to constitute the metal salt, one capable of coordinating with the thiol compound (B) to be mentioned below, thereby forming a complex compound is used, and is appropriately selected for use herein from the viewpoint of the coordination stabilization energy to be mentioned below. Among these, vanadium, iron, copper, cobalt, manganese, titanium, tin, lead, bismuth, zirconium and calcium are preferred, and from the viewpoint of reaction control, iron, cobalt, manganese, titanium and zirconium are more preferred, and from the viewpoint of storage stability, manganese and zirconium are preferred.

The coordination stabilization energy for the metal soap (A1) and the thiol compound (B) may be calculated using a Gaussian 09 program package by Gaussian Corporation. Here, the coordination stabilization energy is a difference between the Gibbs free energy of the thiol compound (B) before coordination reaction and that after coordination reaction. A negative value of the difference means rapid coordination reaction, and a negative value and a larger absolute value thereof mean stronger coordination of the thiol compound (B) with the metal soap (A1).

The coordination reaction is considered to comprise two kinds of an addition reaction of adding the thiol compound (B) to the metal soap (A1) and a substitution reaction of substituting the carboxy group of the metal soap with the thiol compound.

In one specific case where the metal soap (A1) is $(CH_3COO)_n M^{(n)}$ and the thiol compound (B) is $CH_3OCOCH_2CH(CH_3)SH$, the addition reaction formula is expressed by the following formula (1), and the substitution reaction formula is by the following formula (2).

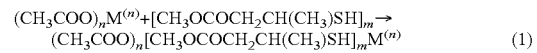

(1)

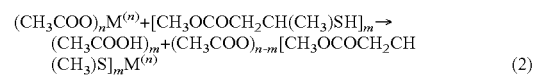

(2)

In the formulae (1) and (2), $M^{(n)}$ represents an n-valent metal atom M.

Results of calculation of the coordination stabilization energy with each metal element M using ethyl acetate as one specific example of the aprotic solvent (C) are summarized in the following Table 1.

For the calculation, wB97XD was used as the density functional. As the basis function, 6-31+G* basis was used for the carbon atom, the hydrogen atom, the oxygen atom and the sulfur atom; SDD basis was for the lanthanoid; and LANL2DZ basis was for the other elements. For taking the solvent effect, an SMD method was applied, and the translation rotation entropy was scaled to ½ to calculate the Gibbs free energy.

TABLE 1

| Metal Element M | Coordination Reaction | n | m | Coordination Stabilization Energy [kcal/mol] | Metal Element M | Coordination Reaction | n | m | Coordination Stabilization Energy [kcal/mol] |
|---|---|---|---|---|---|---|---|---|---|
| Li | addition | 1 | 1 | −10.8 | Rh | exchange | 2 | 2 | −26.2 |
| Na | addition | 1 | 1 | −11.2 | Ir | exchange | 3 | 3 | −39.9 |
| K | addition | 1 | 1 | −6.5 | Ni | addition | 2 | 1 | −16.1 |
| Rb | addition | 1 | 1 | −1.3 | Pd | exchange | 2 | 2 | −29.7 |
| Cs | addition | 1 | 1 | −4.6 | Pt | exchange | 2 | 2 | −33.4 |
| Be | addition | 2 | 1 | −3.6 | Cu | exchange | 2 | 2 | −5.1 |
| Mg | addition | 2 | 1 | −13.5 | Ag | addition | 1 | 1 | −12.4 |
| Ca | addition | 2 | 1 | 0 | Au | exchange | 3 | 3 | −60.4 |
| Sr | addition | 2 | 1 | −0.4 | Zn | addition | 2 | 1 | −8.6 |
| Ba | addition | 2 | 1 | 6.2 | Cd | addition | 2 | 1 | −7.2 |
| Sc | addition | 3 | 1 | −6 | Hg | exchange | 2 | 2 | −12.9 |
| Y | addition | 3 | 1 | −1.6 | Al | addition | 3 | 1 | −0.8 |
| Ti | addition | 2 | 1 | −10.7 | Ga | addition | 3 | 1 | 0.2 |
| Zr | addition | 2 | 1 | −5.6 | In | addition | 3 | 1 | −2 |
| Hf | addition | 2 | 1 | −10.9 | Tl | exchange | 1 | 1 | −0.4 |
| V | addition | 3 | 1 | −3.9 | Ge | exchange | 4 | 4 | −1.3 |
| Nb | exchange | 3 | 1 | −6.7 | Sn | addition | 2 | 1 | −1.7 |
| Cr | addition | 2 | 1 | −2.7 | Pb | addition | 2 | 1 | −1.7 |
| Mo | addition | 2 | 1 | −0.8 | Sb | exchange | 3 | 2 | −0.3 |
| W | exchange | 2 | 2 | −2.7 | Bi | exchange | 3 | 2 | −0.8 |
| Mn | addition | 2 | 1 | −8.1 | Po | exchange | 4 | 2 | −16.9 |
| Tc | exchange | 4 | 4 | −28.8 | La | addition | 3 | 1 | −4.1 |
| Re | exchange | 4 | 4 | −28.5 | Ce | addition | 3 | 1 | −11.9 |
| Fe | addition | 2 | 1 | −10.1 | Pr | addition | 3 | 1 | −1.5 |
| Ru | exchange | 3 | 3 | −28.5 | Nd | addition | 3 | 1 | −8.1 |
| Os | exchange | 4 | 4 | −29.7 | Tb | addition | 3 | 1 | −4.4 |
| Co | addition | 2 | 1 | −10.1 | | | | | |

As shown in Table 1, main metal elements M except calcium, barium and gallium in the metal soap (A1) gave a negative coordination stabilization energy value. From this, it may be said that the metal soap comprising the metal element shown in Table 1 except calcium, barium and gallium can readily coordinate with the thiol compound (B) to form a complex compound.

Examples of the metal soap (A1) include cobalt 2-ethylhexanoate, manganese 2-ethylhexanoate, yttrium 2-ethylhexanoate, tin 2-ethylhexanoate, lead 2-ethylhexanoate, cobalt naphthenate, lead naphthenate, bismuth(III) naphthenate, yttrium naphthenate, and calcium naphthenate. Among these, cobalt 2-ethylhexanoate, manganese 2-ethylhexanoate and cobalt naphthenate are preferably used.

<Metal Complex (A2)>

The metal complex (A2) is a complex where a structure having one carbon between two carbonyl groups, that is, a compound having a β-diketone structure coordinates with a metal element. For example, complex formation is mentioned between a metal element and an acetylacetone, ethyl acetoacetate or benzoyl acetone, and these metal complexes (A2) also express the same function as that of the above-mentioned metal soap (A1)

The metal element to constitute the metal complex (A2) may be the same metal element as that in the metal soap (A1).

Examples of the metal complex (A2) include vanadyl acetylacetonate, cobalt acetylacetonate, titanium acetylacetonate, titanium dibutoxybis(acetylacetonate), iron acetylacetonate, and cobalt ethyl acetoacetate. Among these, from the viewpoint of reaction control, titanium acetylacetonate, and titanium dibutoxybis(acetylacetonate) are preferred.

(Thiol Compound (B))

The thiol compound (B) for use in the curing accelerator of the present invention is a compound selected from the group consisting of a monofunctional primary thiol compound (B1), a secondary thiol compound (B2) and a tertiary thiol compound (B3). Among these, one kind alone may be used or two or more kinds may be used in combination.

Here, "primary thiol compound" indicates a compound having a mercapto group bonding to a primary carbon atom, and "monofunctional" means that the compound has one mercapto group. Similarly, "secondary thiol compound" indicates a compound having a mercapto group bonding to a secondary carbon atom, and "tertiary thiol compound" indicates a compound having a mercapto group bonding to a tertiary carbon atom. In the present invention, a secondary thiol compound having a mercapto group bonding to a primary carbon atom is considered to fall within the category of the secondary thiol compound (B2). Similarly, a tertiary thiol compound having at least any one or more of a mercapto group bonding to a primary carbon atom and a mercapto group bonding to a secondary carbon atom is also considered to fall within the category of the tertiary thiol compound (B3).

In the present invention, the secondary thiol compound (B2) and the tertiary thiol compound (B3) may be either monofunctional or polyfunctional.

The content of the thiol compound (B) in the curing accelerator is, in consideration of the easiness in coordination of the thiol compound (B) with the metal element in the metal-containing compound (A), and the cost and the curing acceleration performance thereof, preferably 0.1 to 15 moles per mol of the metal component in the metal-containing compound (A), more preferably 0.3 to 12 moles, even more preferably 0.6 to 10 moles.

The thiol compound (B) is preferably one having an ester structure represented by the following general formula (Q-1).

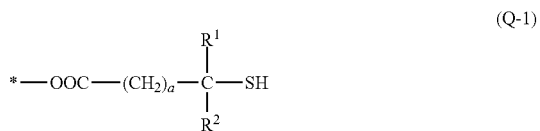

In the formula (Q-1), $R^1$ and $R^2$ each independently represent a hydrogen atom, an alkyl group having 1 to 10 carbon atoms, or an aromatic group having 6 to 18 carbon atoms; * bonds to an organic group; and a represents an integer of 0 to 2.

The a in formula (Q-1) is preferably 1. In the case where the thiol compound (B) has such an ester structure, it is considered that the carbonyl oxygen and the mercapto group could easily coordinate with the metal element M in the metal-containing compound (A), thereby allowing the metal element of the metal-containing compound (A) to be surrounded by the thiol compound (B), as shown by the following formula (T). When the curing accelerator is used in a wet condition, the thiol compound (B) can coordinate in such a manner to prevent the metal element from being in contact with water, and the curing accelerator can thereby stably exhibit curing acceleration performance. In the tertiary thiol compound (B3), both $R^1$ and $R^2$ are substituents that are more bulky than hydrogen therefore often causing steric hindrance in coordination of the mercapto group with the metal element, and consequently, it is considered that the secondary thiol compound (B2) could more readily exhibit curing acceleration performance.

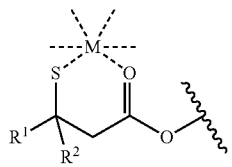

In formula (T), $R^1$ and $R^2$ are as defined above with respect to $R^1$ and $R^2$ in formula (Q-1), and M represents a metal element derived from the metal-containing compound (A).

Accordingly, in particular, in the case where the curing accelerator is used in a wet condition, from the viewpoint of the pot life in curing the radical-polymerizable resin composition to be mentioned below, the thiol compound (B) is preferably one or more selected from the group consisting of the secondary thiol compound (B2) and the tertiary thiol compound (B3), and is more preferably a polyfunctional thiol. "Polyfunctional thiol" as referred to herein means a thiol compound having two or more mercapto groups that are functional groups.

Among these, an ester compound of a mercapto group-containing carboxylic acid represented by the following formula (S) and a polyhydric alcohol is more preferred. Such a compound is obtained through known esterification of the mercapto group-containing carboxylic acid and a polyhydric alcohol.

In the formula (S), $R^3$ represents a hydrogen atom, an alkyl group having 1 to 10 carbon atoms, or an aromatic group having 6 to 18 carbon atoms; $R^4$ represents an alkyl group having 1 to 10 carbon atoms, or an aromatic group having 6 to 18 carbon atoms; and a represents an integer of 0 to 2.

In the case where the mercapto group-containing carboxylic acid represented by the formula (S) is a compound derived from the secondary thiol compound (B2), specific examples thereof include 2-mercaptopropionic acid, 3-mercaptobutyric acid, and 3-mercapto-3-phenylpropionic acid.

In the case where the compound is one derived from the tertiary thiol compound (B3), specific examples thereof include 2-mercaptoisobutyric acid, and 3-mercapto-3-methylbutyric acid.

Examples of the polyhydric alcohol include dihydric alcohols such as ethylene glycol, diethylene glycol, triethylene glycol, tetraethylene glycol, polyethylene glycol, propylene glycol, dipropylene glycol, tripropylene glycol, polypropylene glycol, neopentyl glycol, 1,2-propanediol, 1,3-propanediol, 1,3-butanediol, 1,4-butanediol, 1,2-pentanediol, 1,3-pentanediol, 2,3-pentanediol, 1,4-pentanediol, 1,5-pentanediol, 1,6-hexanediol, 1,9-nonanediol, tricyclodecanedimethanol, 2,2-bis(2-hydroxyethoxyphenyl)propane, bisphenol A alkylene oxide adduct, bisphenol F alkylene oxide adduct, bisphenol S alkylene oxide adduct, 1,4-cyclohexanediol, 1,4-cyclohexanedimethanol, 1,2-hexanediol, 1,3-hexanediol, 2,3-hexanediol, 1,4-hexanediol, 2,4-hexanediol, 3,4-hexanediol, 1,5-hexanediol, 2,5-hexanediol, 1,6-hexanediol, and 9,9-bis[4-(2-hydroxyethyl)phenyl]fluorenone; tri or more hydric alcohols such as glycerin, diglycerin, trimethylolethane, trimethylolpropane, ditrimethylolpropane, tris(2-hydroxyethyl) isocyanurate, hexanetriol, sorbitol, pentaerythritol, dipentaerythritol, sucrose, and 2,2-bis(2,3-dihydroxypropyloxyphenyl)propane; and the others such as polycarbonate diols and dimeric acid polyester polyols.

Among these, from the viewpoint of easy availability and from the viewpoint of exhibiting curing acceleration performance even in a wet condition, dihydric alcohols such as ethylene glycol, 1,2-propanediol, 1,3-propanediol, and 1,4-butanediol; tri or more polyhydric alcohols such as glycerin, trimethylolethane, trimethylolpropane, tris(2-hydroxyethyl) isocyanurate, pentaerythritol, dipentaerythritol, and 2,2-bis (2,3-dihydroxypropyloxyphenyl)propane; polycarbonate diols; and dimeric acid polyester polyols are preferred; and from the viewpoint of the number of functional groups and vapor pressure, 1,4-butanediol, trimethylolethane, trimethylolpropane, tris(2-hydroxyethyl)isocyanurate, pentaerythritol, polycarbonate diols and dimer acid polyester polyols are more preferred.

<Primary Thiol Compound (B1)>

The primary thiol compound (B1) in the present invention is a monofunctional thiol, and specifically includes 3-mercaptopropionic acid and 4-mercaptobutyric acid.

Though the reason is not clear, a polyfunctional primary thiol compound could not make the curing accelerator have sufficient storage stability and, in addition, could not attain sufficient curing acceleration performance in curing a radical-polymerizable resin.

<Secondary Thiol Compound (B2)>

Examples of the secondary thiol compound (B2) include 1,4-bis(3-mercaptobutyryloxy)butane, di(1-mercaptoethyl) 3-mercaptophthalate, di(2-mercaptopropyl) phthalate, di(3-mercaptobutyl) phthalate, ethylene glycol bis(3-mercaptobutyrate), propylene glycol bis(3-mercaptobutyrate), diethylene glycol bis(3-mercaptobutyrate), butanediol bis(3-mercaptobutyrate), octanediol bis(3-mercaptobutyrate), trimethylolethane tris(3-mercaptobutyrate), trimethylolpropane tris(3-mercaptobutyrate), pentaerythritol tetrakis(3-mercaptobutyrate), dipentaerythritol hexakis(3-mercaptobutyrate), ethylene glycol bis(2-mercaptopropionate), propylene glycol bis(2-mercaptopropionate), diethylene glycol bis(2-mercaptopropionate), butanediol bis(2-mercaptopropionate), octanediol bis(2-mercaptopropionate), trimethylolpropane tris(2-mercaptopropionate), pentaerythritol tetrakis(2-mercaptopropionate), dipentaerythritol hexakis(2-mercaptopropionate), ethylene glycol bis(4-mercaptovalerate), diethylene glycol bis(4-mercaptovalerate), butanediol bis(4-mercaptovalerate), octanediol bis(4-mercaptovalerate), trimethylolpropane tris(4-mercaptovalerate), pentaerythritol tetrakis(4-mercaptovalerate), dipentaerythritol hexakis(4-mercaptovalerate), ethylene glycol bis(3-mercaptovalerate), propylene glycol bis(3-mercaptovalerate), diethylene glycol bis(3-mercaptovalerate), butanediol bis(3-mercaptovalerate), octanediol bis(3-mercaptovalerate), trimethylolpropane tris(3-mercaptovalerate), pentaerythritol tetrakis(3-mercaptovalerate), dipentaerythritol hexakis(3-mercaptovalerate), hydrogenated bisphenol A bis(3-mercaptobutyrate), bisphenol A dihydroxyethyl ether-3-mercaptobutyrate, 4,4'-(9-fluorenylidene) bis(2-phenoxyethyl(3-mercaptobutyrate)), ethylene glycol bis(3-mercapto-3-phenylpropionate), propylene glycol bis(3-mercapto-3-phenylpropionate), diethylene glycol bis(3-mercapto-3-phenylpropionate), butanediol bis(3-mercapto-3-phenylpropionate), octanediol bis(3-mercapto-3-phenylpropionate), trimethylolpropane tris(3-mercapto-3-phenylpropionate), tris-2-(3-mercapto-3-phenylpropionate) ethyl isocyanurate, pentaerythritol tetrakis(3-mercapto-3-phenylpropionate), dipentaerythritol hexakis(3-mercapto-3-phenylpropionate), and 1,3,5-tris[2-(3-mercaptobutyryloxyethyl)]-1,3,5-triazine-2,4,6(1H,3H,5H)-trione.

The commercially available secondary thiol compounds (B2) having two or more secondary mercapto groups in the molecule may include 1,4-bis(3-mercaptobutyryloxy)butane (Karenz MT (registered trademark) BD1 manufactured by Showa Denko K.K.), pentaerythritol tetrakis(3-mercaptobutyrate) (Karenz MT (registered trademark) PE1 manufactured by Showa Denko K.K.), 1,3,5-tris[2-(3-mercaptobutyryloxyethyl)]-1,3,5-triazine-2,4,6(1H,3H,5H)-trione (Karenz MT (registered trademark) NR1 manufactured by Showa Denko K.K.), trimethylolethane tris(3-mercaptobutyrate) (TEMB manufactured by Showa Denko K.K.), and trimethylolpropane tris(3-mercaptobutyrate) (TPMB manufactured by Showa Denko K.K.), and these are preferably used here.

<Tertiary Thiol Compound (B3)>

Examples of the tertiary thiol compound (B3) include di(2-mercaptoisobutyl) phthalate, ethylene glycol bis(2-mercaptoisobutyrate), propylene glycol bis(2-mercaptoisobutyrate), diethylene glycol bis(2-mercaptoisobutyrate), butanediol bis(2-mercaptoisobutyrate), octanediol bis(2-mercaptoisobutyrate), trimethylolethane tris(2-mercaptoisobutyrate), trimethylolpropane tris(2-mercaptoisobutyrate), pentaerythritol tetrakis(2-mercaptoisobutyrate), dipentaerythritol hexakis(2-mercaptoisobutyrate), di(3-mercapto-3-methylbutyl) phthalate, ethylene glycol bis(3-mercapto-3-methylbutyrate), propylene glycol bis(3-mercapto-3-methylbutyrate), diethylene glycol bis(3-mercapto-3-methylbutyrate), butanediol bis(3-mercapto-3-methylbutyrate), octanediol bis(3-mercapto-3-methylbutyrate), trimethylolethane tris(3-mercapto-3-methylbutyrate), trimethylolpropane tris(3-mercapto-3-methylbutyrate), pentaerythritol tetrakis(3-mercapto-3-methylbutyrate), and dipentaerythritol hexakis(3-mercapto-3-methylbutyrate).

(Aprotic Solvent (C))

Regarding the aprotic solvent (C) in the curing accelerator of the present invention, an aprotic solvent is used therein from the viewpoint of the coordination stabilization energy of the metal-containing compound (A) with the thiol compound (B). The aprotic solvent is preferably a non-polar or low-polar solvent having a dielectric constant of 10 or less.

For various aprotic solvents and protic solvents, the coordination stabilization energy in the addition reaction of the above-mentioned formula (1) where the metal element M is manganese, n=2 and m=1 is calculated according to the above-mentioned calculation method, and the results are shown in the following Table 2.

TABLE 2

| Solvent | Type | Dielectric Constant (25° C.) | Coordination Stabilization Energy [kcal/mol] |
|---|---|---|---|
| Toluene | aprotic | 2.4 | −12.5 |
| Diethyl Ether | aprotic | 4.2 | −10.3 |
| Ethyl Acetate | aprotic | 6.0 | −8.1 |
| Quinoline | aprotic | 9.2 | −6.3 |
| Methanol | protic | 32.6 | 1.2 |
| Water | protic | 78.4 | 1 |

As shown in Table 2, with the aprotic solvent, the coordination stabilization energy is a negative value and the absolute value thereof is more than 5. From this, it may be said that, when an aprotic solvent is used, the thiol compound (B) can strongly coordinate with the metal soap (A1) to form a complex compound.

As opposed to this, with the polar protic solvent methanol or water, the coordination stabilization energy is a positive value, and it is considered that a complex compound of the thiol compound (B) coordinating with the metal soap (A1) could not be formed.

Preferred examples of the aprotic solvent (C) include an aliphatic hydrocarbon, an aromatic hydrocarbon, an ether, a ketone, an ester and a chain carbonate. Among these, one kind alone may be used or two or more kinds may be used in combination.

Examples of the aliphatic hydrocarbon include cyclohexane, n-hexane, and mineral spirits such as white spirit and odorless mineral spirit (OMS).

Examples of the aromatic hydrocarbon include naphthene, a mixture of naphthene and paraffin, benzene, toluene, and quinoline.

Examples of the ether include diethyl ether, and diisopropyl ether.

Examples of ketones include acetone, methyl ethyl ketone, and cyclohexanone.

Examples of the ester include ethyl acetate, butyl acetate, diethyl malonate, diethyl succinate, dibutyl succinate, dibutyl maleate, 2,2,4-trimethylpentanediol diisobutyrate, mono and diesters of ketoglutaric acid, pyruvates, and mono and diesters of ascorbic acid such as ascorbic acid palmitate.

Examples of the chain carbonate include dimethyl carbonate and diethyl carbonate.

In addition, 1,2-dioximes, N-methylpyrrolidone, N-ethylpyrrolidinone, and dimethylformamide are also usable.

The content of the aprotic solvent (C) in the curing accelerator is, from the viewpoint of storage stability of the curing accelerator, for securing a sufficient pot life and from the viewpoint of processability, preferably 100 to 1,000 parts by mass relative to 100 parts by mass of the total of the metal-containing compound (A) and the thiol compound (B), more preferably 100 to 500 parts by mass, even more preferably 120 to 300 parts by mass.

[Radical-Polymerizable Resin Composition]

The radical-polymerizable resin composition of the present invention comprises the curing accelerator and a radical-polymerizable compound (D). The radical-polymerizable compound can be rapidly cured since it is in the form of a resin composition mixed with the above-mentioned curing accelerator of the present invention.

For improving the processability to produce a cured resin product and from the viewpoint of more rapidly curing the radical-polymerizable resin composition, preferably, the radical-polymerizable resin composition comprises a radical polymerization initiator (E).

(Radical-Polymerizable Compound (D))

The radical-polymerizable compound (D) is a compound having an ethylenically unsaturated hydrocarbon group in the molecule and undergoing radical polymerization. One kind alone of such a compound may be used or two or more kinds thereof may be used in combination.

The content of the radical-polymerizable compound (D) in the radical-polymerizable resin composition may be appropriately determined depending on the intended use and application of the radical-polymerizable resin composition, and may be, from the viewpoint of obtaining a good cured product of the resin composition, 10 to 99% by mass, more preferably 20 to 98% by mass, even more preferably 50 to 98% by mass.

The content of the curing accelerator in the radical-polymerizable resin composition is, from the viewpoint of a sufficient pot life of the curing accelerator and curing acceleration performance, preferably such that the total content of the metal-containing compound (A) in the curing accelerator could be 0.01 to 5 parts by mass relative to the radical-polymerizable compound (D), more preferably 0.05 to 2 parts by mass, even more preferably 0.1 to 1 part by mass.

From the same viewpoint, in the radical-polymerizable resin composition, the total content of the thiol compound (B) in the curing accelerator is preferably 0.01 to 10 parts by mass relative to 100 parts by mass of the radical-polymerizable compound (D), more preferably 0.05 to 5 parts by mass, even more preferably 0.1 to 3 parts by mass.

Not specifically limited thereto, examples of the radical-polymerizable compound (D) include a vinyl ester resin such as an epoxy (meth)acrylate resin; an unsaturated polyester resin, a polyester (meth)acrylate resin, an urethane (meth)acrylate resin, a (meth)acrylate resin, a radical-polymerizable unsaturated monomer, and a mixture of the above-mentioned resin and a radical-polymerizable unsaturated monomer. Among these, a vinyl ester resin, an unsaturated polyester resin, and a mixture of each of these resins and a radical-polymerizable unsaturated monomer having a vinyl group or a (meth)acryloyl group are preferred. (Meth)

acrylate means acrylate or methacrylate, and a (meth)acryloyl group means an acryloyl group or a methacryloyl group.

(Radical Polymerization Initiator (E))

The radical polymerization initiator (E) is a curing agent to initiate radical polymerization reaction of the radical-polymerizable resin composition. Therefore, the radical polymerization initiator may be separately added to the radical-polymerizable resin composition, or may be previously included in the radical-polymerizable resin composition combined with the curing accelerator of the present invention to thereby more rapidly obtain a cured product of the resin composition.

The content of the radical polymerization initiator (E) in the radical-polymerizable resin composition is appropriately determined depending on the kind of the radical-polymerizable resin compound (D), and on the use condition and the reaction condition for the resin composition. In general, the content is preferably 0.1 to 10 parts by mass relative to 100 parts by mass of the radical-polymerizable compound (D), more preferably 0.5 to 8 parts by mass, even more preferably 0.5 to 5 parts by mass.

The kind of the radical polymerization initiator (E) may be appropriately selected depending on the kind of the radical-polymerizable resin compound (D) and on the use condition and the reaction condition for the resin composition, and any known thermal radical polymerization initiator or photoradical polymerization initiator may be used. Among these, one kind alone may be used or two or more kinds may be used in combination.

Specifically, the thermal radical polymerization initiator includes organic peroxides, for example, diacyl peroxides such as benzoyl peroxide; peroxy esters such as tert-butyl peroxybenzoate; hydroperoxides such as cumene hydroperoxide; dialkyl peroxides such as dicumyl peroxide; ketone peroxides such as methyl ethyl ketone peroxide, and acetylacetone peroxide; and peroxyketals, alkyl peresters, and percarbonates.

Examples of the photoradical polymerization initiator include benzoin ethers such as benzoin alkyl ethers; benzophenones such as benzophenone, benzil, and methyl orthobenzoyl benzoate; acetophenones such as benzyl dimethyl ketal, 2,2-diethoxyacetophenone, 2-hydroxy-2-methylpropiophenone, 4-isopropyl-2-hydroxy-2-methylpropiophenone, and 1,1-dichloroacetophenone; and thioxanthones such as 2-chlorothioxanthone, 2-methylthioxanthone, and 2-isopropylthioxanthone.

(Use, and Other Components)

The radical-polymerizable resin composition has many uses for adhesives, primers, coating compositions, inorganic structure repairing materials for concrete section repairing, crack injection or water sealing, and fiber-reinforced composite materials.

In the case of using as a coating material, a colorant may be added to the radical-polymerizable resin composition, and in the case of using as an inorganic structure repairing material, a filler may be added thereto. Components necessary for functional expression in accordance with various uses may be added to the radical-polymerizable resin composition, for example, fibers may be added thereto to give a fiber-reinforced composite material.

EXAMPLES

The present invention is described in more detail with reference to Examples, but the present invention is not limited to the Examples.

[Preparation of Curing Accelerator]

Details of the raw materials for the curing accelerator, used in Examples and Comparative Examples, are mentioned below.

<Metal-Containing Compound (Containing Liquid)>

(A1-1) Manganese octylate (manganese 2-ethylhexanoate); "Hexoate Manganese" manufactured by Toei Chemical Industry Co., Ltd., metal soap, manganese content 8% by mass, solvent: mineral spirit, molecular weight 341.35

<Monofunctional Primary Thiol Compound>

(B1-1) 3MPA: 3-mercaptopropionic acid manufactured by Aldrich Corporation, molecular weight 106.14

<Polyfunctional Primary Thiol Compound>

(B'1-1) TMMP: trimethylolpropane tris(3-mercaptoproionate); manufactured by Yodo Kagaku Co., Ltd., trifunctional, molecular weight 398.50

(B'1-2) TBMPIC: tris[(3-mercaptopropionyloxy)-ethyl] isocyanurate; manufactured by SC Organic Chemical Co., Ltd., trifunctional, molecular weight 525.62

(B'1-3) PEMP: pentaerythritol tetrakis(3-mercaptopropionate); manufactured by SC Organic Chemical Co., Ltd., tetrafunctional, molecular weight 488.64

<Secondary Thiol Compound>

(B2-1) 3MBA: 3-mercaptobutyric acid; manufactured by Yodo Kagaku Co., Ltd., monofunctional, molecular weight 120.17

(B2-2) BD1: 1,4-bis(3-mercaptobutyryloxy)butane; "Karenz MT (registered trademark) BD1" manufactured by Showa Denko K.K., difunctional, molecular weight 299.43

(B2-3) TMPB: trimethylolpropane tris(3-mercaptobutyrate); "TPMB" manufactured by Showa Denko K.K., trifunctional, molecular weight 440.64 (B2-4) NR1: 1,3,5-tris[2-(3-mercaptobutytyloxy)ethyl]-1,3,5-triazine-2,4,6-(1H,3H,5H)-trione; "Karenz MT (registered trademark) NR1" manufactured by Showa Denko K.K., trifunctional, molecular weight 567.67

(B2-5) PE1: pentaerythritol tetrakis(3-mercaptobutyrate); "Karenz MT (registered trademark) PE1" manufactured by Showa Denko K.K., tetrafunctional, molecular weight 544.76

<Tertiary Thiol Compound>

(B3-1) TPMIB: trimethylolpropane tris(2-mercaptoisobutyrate) synthesized in the following Synthesis Example 1, trifunctional, molecular weight 440.64

<Solvent>

(C-1) ethyl acetate; manufactured by Sankyo Chemical Co., Ltd., aprotic, dielectric constant 6.0 (25° C.)

(C-2) toluene; manufactured by Junsei Chemical Co., Ltd., aprotic, dielectric constant 2.4 (25° C.)

(C'-1) methanol; manufactured by Sankyo Chemical Co., Ltd., protic, dielectric constant 32.6 (25° C.)

(C'-2) water; protic, dielectric constant 78.4 (25° C.)

(Synthesis Example 1) Synthesis of Trimethylolpropane tris(2-mercaptoisobutyrate) (TPMIB)

2.68 g (20 mmol) of trimethylolpropane (manufactured by Tokyo Chemical Industry Co., Ltd.), 7.57 g (63 mmol) of 2-mercaptoisobutanoic acid (manufactured by Showa Denko K.K.), 0.23 g (1.2 mmol) of p-toluenesulfonic acid monohydrate and 20 g of toluene (manufactured by Junsei Chemical Co., Ltd.) were put into a 100-mL eggplant flask, which was then equipped with a Dean-Stark apparatus and a condenser tube.

With stirring, the contents were heated using an oil bath at 145° C. After stirred for 3 hours, this was left cooled to room temperature, and neutralized with 50 mL of an aqueous 5 mass % sodium hydrogencarbonate solution. Further, the organic layer was washed twice with ion-exchanged water, then dewatered and dried with anhydrous magnesium sulfate, toluene was evaporated away, and the residue was purified through silica gel column chromatography (silica gel: Wako Gel C-200, developing solvent: n-hexane/ethyl acetate=5/1 (ratio by volume) to give a white crystal TPMIB.

Examples 1 to 9, Comparative Examples 1 to 6

In the blending ratio shown in Table 3 below, a solvent was added to a metal-containing compound, and then a thiol compound was added thereto, and stirred and mixed to give a curing accelerator.

[Storage Stability Evaluation Test]

The curing accelerator prepared in the above Examples and Comparative Examples was put into a 50-mL glass sample bottle and sealed up, and the sample bottle was statically kept in a constant temperature chamber at 40° C. and stored as such for 28 days.

The condition of the curing accelerator after 28 days was visually observed to evaluate the storage stability thereof. The evaluation results are shown in Table 3.

TABLE 3

| | | | | | Example | | | | | | | | |
|---|---|---|---|---|---|---|---|---|---|---|---|---|---|
| | | | | 1 | 2 | 3 | 4 | 5 | 6 | 7 | 8 | 9 |
| | Curing Accelerator No. | | | 1 | 2 | 3 | 4 | 5 | 6 | 7 | 8 | 9 |
| Metal-Containing Compound (Containing Liquid) [g] | Metal Soap | | A1-1 | 0.7 | 0.8 | 1.0 | 1.0 | 1.0 | 1.0 | 1.2 | 0.9 | 1.0 |
| | Solvent Content | | | 0.35 | 0.4 | 0.5 | 0.5 | 0.5 | 0.5 | 0.6 | 0.45 | 0.5 |
| Thiol Compound [g] | primary | mono-functional | B1-1 | 1.0 | | | | | | | | |
| | | poly-functional | B'1-1 | | | | | | | | | |
| | | | B'1-2 | | | | | | | | | |
| | | | B'1-3 | | | | | | | | | |
| | secondary | mono-functional | B2-1 | | 1.0 | | | | | | | |
| | | poly-functional | B2-2 | | | 0.5 | 1.0 | 1.0 | | | | |
| | | | B2-3 | | | | | | 1.0 | | | |
| | | | B2-4 | | | | | | | 1.0 | | |
| | | | B2-5 | | | | | | | | 1.0 | |
| | tertiary | poly-functional | B3-1 | | | | | | | | | 1.0 |
| Solvent [g] | aprotic | | C-1 | | | | | 2.0 | | | | |
| | | | C-2 | 2.0 | 2.0 | 2.0 | | 2.0 | 2.0 | 2.0 | 2.0 | 2.0 |
| | protic | | C'-1 | | | | | | | | | |
| | | | C'-2 | | | | | | | | | |
| Metal-Containing Compound + Thiol Compound | | | x [g] | 1.35 | 1.4 | 1.0 | 1.5 | 1.5 | 1.5 | 1.6 | 1.45 | 1.5 |
| Total of Aprotic Solvent | | | y [g] | 2.35 | 2.4 | 2.5 | 2.5 | 2.5 | 2.5 | 2.6 | 2.45 | 2.5 |
| (y/x) × 100 | | | | 170 | 170 | 250 | 170 | 170 | 170 | 160 | 170 | 170 |
| Thiol Compound/Metal Component (ratio by mol) | | | | 9.4 | 7.1 | 1.1 | 2.3 | 2.3 | 1.6 | 1.0 | 1.4 | 1.6 |
| Storage Stability (40° C., 28 days) | | | | no change | no change | no change | no change | no change | no change | no change | no change | no change |

| | | | | Comparative Example | | | | | |
|---|---|---|---|---|---|---|---|---|---|
| | | | | 1 | 2 | 3 | 4 | 5 | 6 |
| | Curing Accelerator No. | | | 10 | 11 | 12 | 13 | 14 | 15 |
| Metal-Containing Compound (Containing Liquid) [g] | Metal Soap | | A1-1 | 0.9 | 1.2 | 0.8 | 1.0 | 1.0 | 1.0 |
| | Solvent Content | | | 0.45 | 0.6 | 0.4 | 0.5 | 0.5 | 0.5 |
| Thiol Compound [g] | primary | mono-functional | B1-1 | | | | | | |
| | | poly-functional | B'1-1 | 1.0 | | | | | |
| | | | B'1-2 | | 1.0 | | | | |
| | | | B'1-3 | | | 1.0 | | | |

TABLE 3-continued

|  |  |  |  |  |  |  |  |  |
|---|---|---|---|---|---|---|---|---|
|  | secondary | mono-functional | B2-1 |  |  |  |  |  |
|  |  | poly-functional | B2-2 |  |  |  | 1.0 | 1.0 | 1.0 |
|  |  |  | B2-3 |  |  |  |  |  |
|  |  |  | B2-4 |  |  |  |  |  |
|  |  |  | B2-5 |  |  |  |  |  |
|  | tertiary | poly-functional | B3-1 |  |  |  |  |  |
| Solvent [g] |  | aprotic | C-1 |  |  |  |  |  |
|  |  |  | C-2 | 2.0 | 2.0 | 2.0 |  |  |
|  |  | protic | C'-1 |  |  |  | 2.0 |  |
|  |  |  | C'-2 |  |  |  |  | 2.0 |
| Metal-Containing Compound + Thiol Compound |  |  | x [g] | 1.45 | 1.6 | 1.4 | 1.5 | 1.5 | 1.5 |
| Total of Aprotic Solvent |  |  | y [g] | 2.45 | 2.6 | 2.4 | 0.5 | 0.5 | 0.5 |
| (y/x) × 100 |  |  |  | 170 | 160 | 170 | 33 | 33 | 33 |
| Thiol Compound/ Metal Component (ratio by mol) |  |  |  | 1.9 | 1.1 | 1.8 | 2.3 | 2.3 | 2.3 |
| Storage Stability (40° C., 28 days) |  |  |  | partly precipitated | partly precipitated | partly precipitated | partly crystallized | separated | separated |

As known from the results shown in Table 3, it is recognized that the curing accelerators of Examples 1 to 9 underwent no specific change and had sufficient storage stability.

As opposed to these, the curing accelerators using a primary polyfunctional thiol (Comparative Examples 1 to 3) partly precipitated and could redissolve in the solvent when mixed, but the storage stability thereof could not be said to be sufficient.

In the cases where the amount of the aprotic solvent is smaller than the total mass of the metal-containing compound and the thiol compound (Comparative Examples 4 to 6), with respect to Comparative Example 4, the curing accelerator partly crystallized and could hardly redissolve in the solvent, and in the case where a protic solvent was added (Comparative Examples 5 and 6), the curing accelerators underwent phase separation.

[Preparation of Radical-Polymerizable Resin Composition Sample]

According to JIS K 6901:2008 "5.9 Cold Curing Characteristics (exothermic method)", a radical-polymerizable resin composition sample for the curing acceleration performance evaluation test to be mentioned below was prepared.

Details of the radical-polymerizable compound and the radical polymerization initiator used in the radical-polymerizable resin composition sample mentioned below are as follows.

<Radical-Polymerizable Compound>
(D-1) Vinyl ester resin; "Ripoxy (registered trademark) NSR-1000" manufactured by Showa Denko K.K.
<Radical Polymerization Initiator>
(E-1) Cumene hydroperoxide; "Percumyl (registered trademark) 11-80" manufactured by NOF Corporation Examples 10 to 18, Comparative Examples 7 to 10

The curing accelerator tested according to the storage stability evaluation test as above was added to 100 g of the radical-polymerizable compound (D-1) in the blending ratio shown in Table 4 below, and further, 1.0 g of the radical polymerization initiator (E-1) was added thereto and mixed to prepare a radical-polymerizable resin composition sample.

The curing accelerators of Comparative Examples 5 and 6 separated, and therefore radical-polymerizable resin composition samples using them were not prepared.

Reference Example 1

The same composition as that of the curing accelerator 13 (1 g of the metal-containing compound containing liquid (A1-1) and 1.0 g of the secondary thiol compound (B2-2)) was added to 100 g of the radical-polymerizable compound (D-1), and further, 1.0 g of the radical polymerization initiator (E-1) was added thereto to prepare a radical-polymerizable resin composition sample.

[Curing Acceleration Performance Evaluation Test]

According to JIS K 6901:2008 "5.9 Cold Curing Characteristics (exothermic method)", the gelling time (time taken to reach 30° C.), the minimum curing time (time taken to reach the highest temperature), and the maximum exothermic temperature (highest temperature) were measured to evaluate the curing acceleration performance of the curing accelerator. The evaluation results are shown in Table 4.

For measuring the temperature, the radical-polymerizable resin composition produced in Examples, Comparative Examples and Reference Example was put into a depth of 100 mm of a test tube (outer diameter 18 mm, length 165 mm) previously set in a constant temperature water tank at a preset temperature of 25° C., and the temperature of the sample thus filled in the test tube was measured with a thermocouple.

TABLE 4

|  | No. | Curing Accelerator [g] | | Gelling Time | Minimum Curing Time | Maximum Exothermic Temperature [° C.] |
|  |  | Added Amount | (A1-1) Content |  |  |  |
| --- | --- | --- | --- | --- | --- | --- |
| Example 10 | 1 | 3.7 | 0.35 | 15 min 15 sec | 23 min 00 sec | 98.1 |
| Example 11 | 2 | 4.0 | 0.40 | 12 min 50 sec | 19 min 25 sec | 100.3 |
| Example 12 | 3 | 3.5 | 0.50 | 13 min 15 sec | 20 min 40 sec | 104.0 |
| Example 13 | 4 | 4.0 | 0.50 | 15 min 35 sec | 23 min 25 sec | 96.1 |
| Example 14 | 5 | 4.0 | 0.50 | 15 min 40 sec | 23 min 00 sec | 98.3 |
| Example 15 | 6 | 4.0 | 0.50 | 16 min 10 sec | 23 min 40 sec | 96.5 |
| Example 16 | 7 | 4.2 | 0.60 | 15 min 55 sec | 24 min 00 sec | 94.3 |
| Example 17 | 8 | 3.9 | 0.45 | 15 min 30 sec | 26 min 55 sec | 85.4 |
| Example 18 | 9 | 4.0 | 0.50 | 11 min 50 sec | 17 min 45 sec | 102.4 |
| Comparative Example 7 | 10 | 3.9 | 0.45 | 40 min 45 sec | 60 min 20 sec | 57.8 |
| Comparative Example 8 | 11 | 4.2 | 0.60 | 58 min 15 sec | 74 min 20 sec | 48.9 |
| Comparative Example 9 | 12 | 3.8 | 0.40 | 65 min 40 sec | 84 min 10 sec | 36.9 |
| Comparative Example 10 | 13 | 2.0 | 0.50 | not cured | not cured | not cured |
| Reference Example 1 | (A1-1) 1.0 g | (B2-2) 1.0 g | | 16 min 00 sec | 23 min 15 sec | 98.5 |

As known from the results shown in Table 4, the samples (Examples 10 to 18) using any of the curing accelerators of Examples 1 to 9 (Nos. 1 to 9) were almost on the same level in point of the gelling time, the minimum curing time and the maximum exothermic temperature, as that of the sample added separately with the metal-containing compound and the thiol compound (Reference Example 1). From this, it may be said that the curing accelerators of the present invention can exhibit good curing acceleration performance while securing a sufficient pot life in curing a radical-polymerizable resin.

As opposed to these, the samples (Comparative Examples 7 to 9) using any of the curing accelerators of Comparative Examples 1 to 3 (Nos. 10 to 12) that had partly precipitated had a longer curing time and a longer minimum curing time and had a lower maximum exothermic temperature as compared with the sample of Reference Example 1. It is considered that, in these curing accelerators, a part of the primary polyfunctional thiol compound would have undergone side reaction of disulfide formation to degrade the curing acceleration performance of the curing accelerators.

In the sample (Comparative Example 10) using the curing accelerator of Comparative Example 4 (No. 13) that had partly crystallized, only the solution part except the crystal was used, but no reaction occurred therein.

The invention claimed is:
1. A curing accelerator for radical-polymerizable resins, comprising a metal-containing compound (A), a thiol compound (B) and an aprotic solvent (C),
   wherein the metal-containing compound (A) is one or more compounds selected from the group consisting of a metal soap (A1) and a β-diketone skeleton-having metal complex (A2),
   a metal element to constitute the metal-containing compound (A) is at least one selected from the group consisting of iron, cobalt, manganese, titanium and zirconium,
   the thiol compound (B) is one or more compounds selected from the group consisting of a mono-functional primary thiol compound (B1), a secondary thiol compound (B2) and a tertiary thiol compound (B3),
   the thiol compound (B) has an ester structure represented by the following general formula (Q-1):

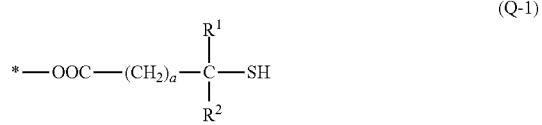

Wherein $R^1$ and $R^2$ each independently represent a hydrogen atom, an alkyl group having 1 to 10 carbon atoms, or an aromatic group having 6 to 18 carbon atoms; * bonds to an organic group; and a represents an integer of 0 to 2, and
   the content of the aprotic solvent (C) is from 10 to 1,000 parts by mass relative to 100 parts by mass of the total of the metal-containing compound (A) and the thiol compound (B).

2. The curing accelerator according to claim 1, wherein the thiol compound (B) is one or more selected from the group consisting of a secondary thiol compound (B2) and a tertiary thiol compound (B3), and is an ester compound of a mercapto group-containing carboxylic acid represented by the following general formula (S) and a polyhydric alcohol:

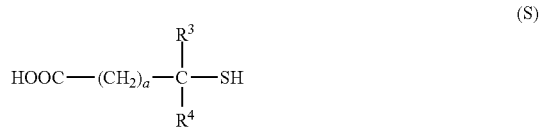

wherein $R^3$ represents a hydrogen atom, an alkyl group having 1 to 10 carbon atoms, or an aromatic group having 6 to 18 carbon atoms; $R^4$ represents an alkyl group having 1 to 10 carbon atoms, or an aromatic group having 6 to 18 carbon atoms; and a represents an integer of 0 to 2.

3. The curing accelerator according to claim 1, wherein the aprotic solvent (C) is one or more compounds selected from the group consisting of an aliphatic hydrocarbon, an aromatic hydrocarbon, an ether, a ketone, an ester and a chain carbonate.

4. The curing accelerator according to claim 1, wherein the content of the thiol compound (B) is from 0.01 to 15 mol relative to 1 mol of the metal component of the metal-containing compound (A).

5. A radical-polymerizable resin composition comprising the curing accelerator of claim 1, and a radical-polymerizable compound (D).

6. The radical-polymerizable resin composition according to claim 5, further comprising a radical polymerization initiator (E).

\* \* \* \* \*